United States Patent [19]
Wright

[11] 3,783,965
[45] Jan. 8, 1974

[54] AIR CUSHION VEHICLE SEAL SYSTEM
[75] Inventor: Raymond Grenville Whitehead Wright, New Orleans, La.
[73] Assignee: Textron Inc., Providence, R.I.
[22] Filed: May 25, 1972
[21] Appl. No.: 256,886

[52] U.S. Cl. .............................. 180/128, 180/125
[51] Int. Cl. ............................................. B60v 1/16
[58] Field of Search..................... 180/116, 117, 123, 180/124, 127, 126, 119, 128, 125

[56] References Cited
UNITED STATES PATENTS
3,420,330  1/1969  Bliss ................................... 180/127
3,332,508  7/1967  Bertin et al. ....................... 180/124
3,444,952  5/1969  Clarke ................................ 180/127
3,363,718  1/1968  Hammett ........................... 180/124
3,395,772  8/1968  Francis et al. ..................... 180/127
3,397,753  8/1968  Hunt et al. ........................ 180/127
3,478,836  11/1969 Eckered et al. ................... 180/128
3,265,144  8/1966  Shaw ................................. 180/127

FOREIGN PATENTS OR APPLICATIONS
1,208,924  10/1970  Great Britain ..................... 180/128

Primary Examiner—David Schonberg
Assistant Examiner—John P. Silverstrim
Attorney—Bean & Bean

[57] ABSTRACT

In an air cushion vehicle, a novel side-by-side arrangement of a plurality of like sized-and-shaped two-part "jupe" type air-inflated cell-bag units of novel form; providing a novel two-stage stiffness air cushion seal system featuring improved maintainability.

12 Claims, 8 Drawing Figures

PATENTED JAN 8 1974

PATENTED JAN 8 1974

AIR CUSHION VEHICLE SEAL SYSTEM

BACKGROUND OF THE INVENTION

The invention has particular application to vehicles of the so-called surface effect type; that is to vehicles for travelling over any land/water/marsh/snow/ice surface, or the like; and which when in operation are supported above the surface at least in part by a transient cushion of pressurized gas such as air which is maintained thereunder by a so-called "jupe" or "finger" type seal system, as disclosed for example in U.S. Pat. No. 3,260,323 and British Pat. No. 1,257,936. Such vehicles confront difficult efficient air-sealing problems, as well as seal device deterioration (wear-out) problems. The present invention provides an improved solution to the aforesaid problems; while at the same time relies upon use of pluralities of only a single "standarized" sized and formed, novel composite cell and bag type seal device to constitute the entire air cushion seal system throughout the peripheral extent of the vehicle.

THE DRAWING

By way of example, the invention is illustrated by the accompanying drawing, wherein.

Figure 1:
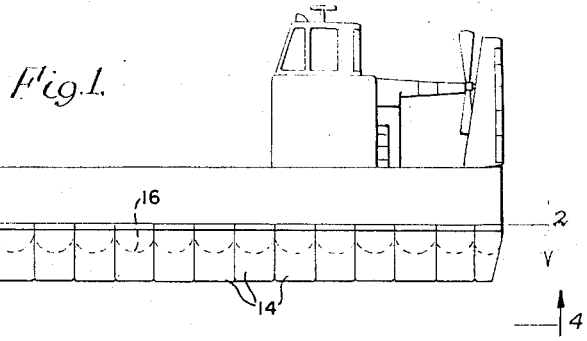
FIG. 1 is a side elevational view of an air cushion vehicle embodying an improved air-seal system of the present invention.

As shown by the drawing herewith, the invention is applicable to any type air cushion supported vehicle employing a peripherally (at least in part) arranged series of side-by-side disposed air sealing cell-bag units depending vertically below the platform or so-called hard structure 10 of the vehicle. In accordance with the present invention each cell-bag unit which is designated generally at 12 comprises an outer cell member 14 and an inner bag member 16. The cell and bag members are both fabricated of flexible fabric; and as best shown at FIGS. 6, 7, the cell members 14 are of frusto-cylindrical and slightly tapering as well as sidewise flattened configuration, while the bag members 16 are of hemispherical configuration and are nested within the cells 16.

Each composite cell-bag assembly is attached to the bottom of the vehicle platform by any suitable means as will be explained hereinafter; each unit assembly being thereby mounted in air-flow communication with an appropriate air inlet duct as indicated at 18 (FIGS. 3, 5, 7, 9) for delivery therethrough of cushion supply air from any suitable source, as known in the art. As illustrated herein, each bag 16 is formed with a pre-sized air escape aperture 20 which is so proportioned relative to the sectional area of the open lower end 22 of its enclosing cell 14 as to provide for simultaneous inflation of the cell and bag members into the configurations thereof as are shown in the drawing herewith, whenever air is delivered under pressure thereinto through the ducts 18.

It is to be especially noted that the orifice 20 will be suitably sized so as to provide the desired degree of stiffness of the bag 16. Thus, the air passing through the bag 16 pneumatically stiffens it into the configuration shown, while at the same time passing into and inflating the cell 14 as it exits therefrom at the bottom of the cell to provide the requisite air supply for the vehicle support cushion. Optionally, a supplemental pressurized air supply source may be used to independently furnish the air cushion space beneath the vehicle with an adequate supply of air, at relatively low pressure compared to the air pressure supply through the bags 16. It is also to be understood that in lieu of the single aperture arrangement as shown herein at 20, the bag members may be formed with pluralities of small-sized apertures; or of permeable fabric, such as an open mesh fabric. In any case the blockage ratio will be predetermined so as to provide the desired stiffness and air-flow characteristics.

Figure 7:
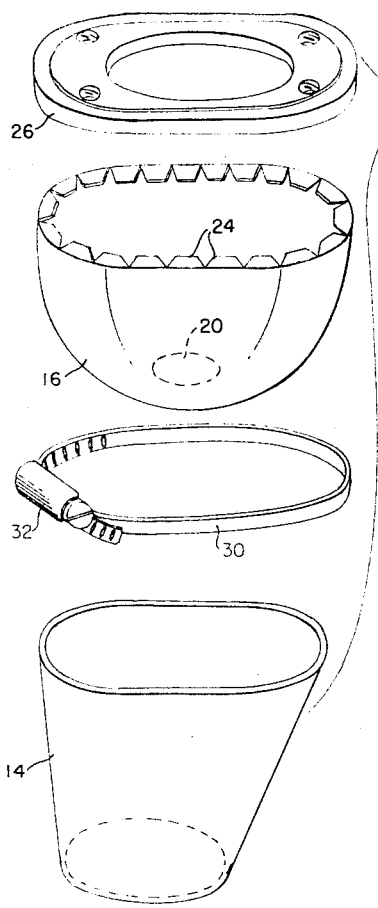
FIG. 7 is an exploded view, in perspective, of the components comprising the cell-bag unit device of FIG. 6; and another modified shape of seal cell device.
Figure 6:
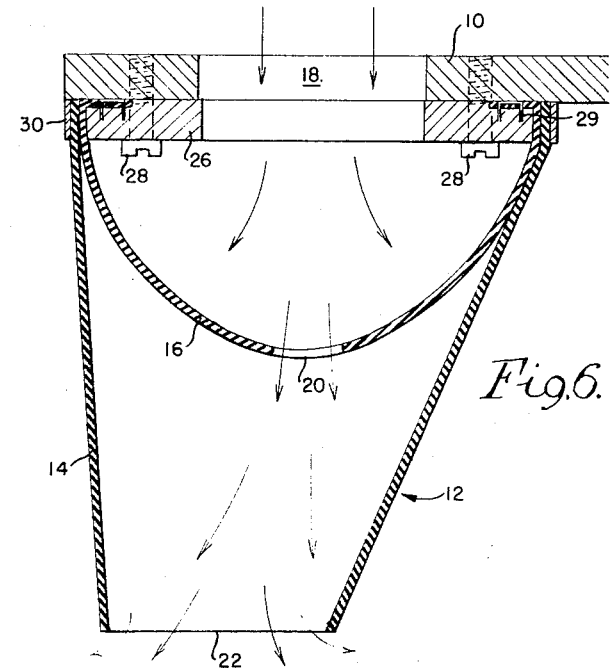
FIG. 6 is an enlarged scale sectional view showing a slightly modified shape of cell device taken as indicated by the encirclement designated "6" on FIG. 3, and showing one method of attachment of the bag-cell units to the vehicle hard structure.
Figure 8:
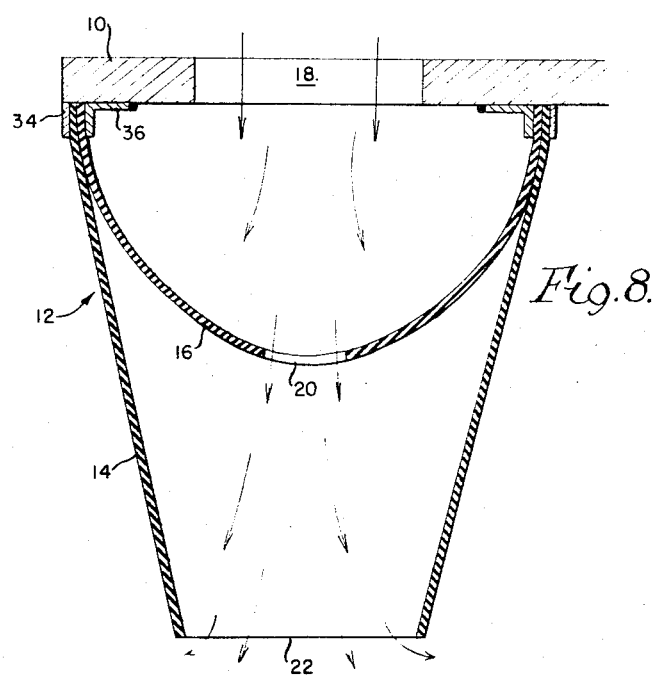
FIG. 8 illustrates an alternative form of arrangement for detachably assembling the bag-cell units to the vehicle hard structure.

FIGS. 6-7 illustrate by way of example one method of construction and assembly of the cell-bag units relative to the vehicle platform, wherein the bag member 16 is provided with inturned flange devices 24 so as to overhang a mounting plate 26 which is adapted to be subsequently affixed to the vehicle platform 12 as indicated at 28. The cell flanges may be affixed to the plate 26 by staples 29, or by adhesive, or any other method, as preferred. The cell member 14 may then be detachably clamped around its upper edge upon the bag-plate assembly 16–26, as by means of a clamping ring 30. As shown at FIG. 7, the ring 30 may include a tightening device 32; or alternatively thereof an endless elastic ring type clamp 34 may be used as is illustrated at FIG. 8, to clamp the bag-cell unit to a collar 36 which is affixed to the platform 12. In any case it is a particular feature of the present invention that each cell-bag unit comprises a two-stage stiffness air cushion seal device delivering through its lower open end portion the requisite vehicle support cushion air supply; it being understood that a supplemental air supply directly into the air cushion cavity may also be employed, as explained hereinabove.

It is a particular feature of the invention that by virtue of this arrangement the lower end portions of the cells 14 receive all of the wear and tear accompanying typical operations of such vehicles, whereby the bag members 16 are shielded therefrom and remain intact. Inasmuch as the cell members are of substantially cylindrical form and only slightly enlarge in cross sectional area progressively upwardly, the air delivery characteristics of the cells remain substantially unaffected as the lower ends of the cells are worn away. Furthermore, inasmuch as the cells are readily detachable from their bag members, whenever a ceil member is badly worn or otherwise damaged it may be quickly removed and replaced, without requiring any more elaborate typical "dry-docking" operations or the like for replacement of the entire seal system.

Figure 2:
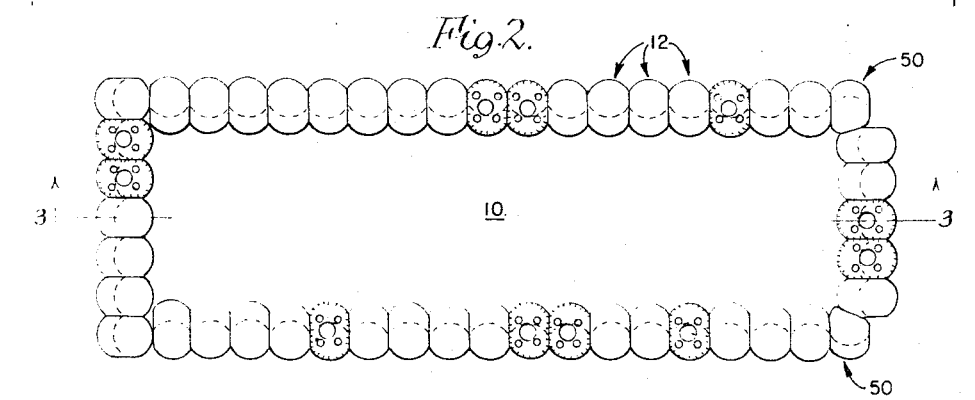
FIG. 2 is a horizontal sectional view, taken as indicated by lines 2—2 of FIG. 1, showing the top plan-view arrangement of the air cushion seal units of the present invention as attached to the platform or "hard structure" of the vehicle.
Figure 3:
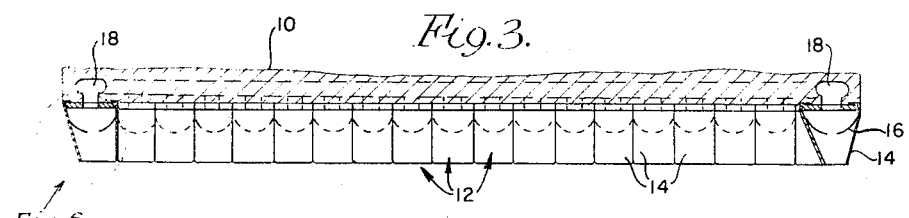
FIG. 3 is a vertical sectional view, taken as suggested by line 3—3 of FIG. 2.
Figure 4:
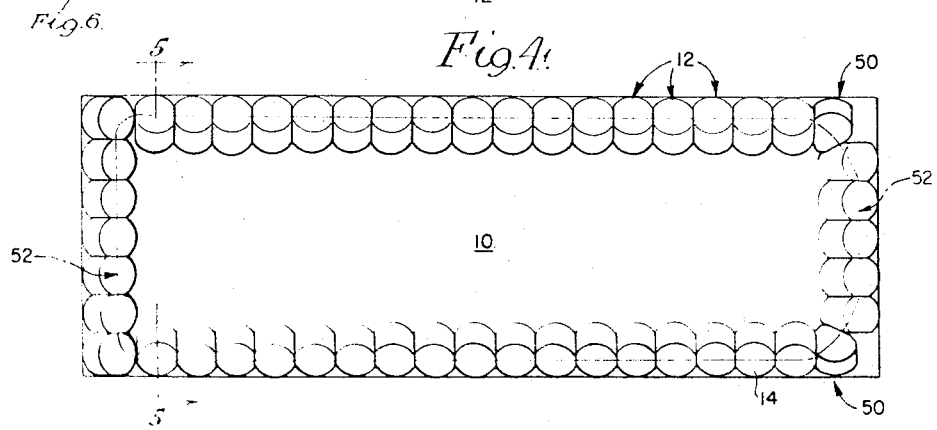
FIG. 4 is a bottom plan-view, taken as suggested by line 4—4 of FIG. 1.
Figure 5:
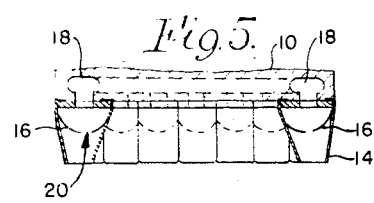
FIG. 5 is a vertical sectional view thereof taken as indicated by line 5—5 of FIG. 4.

FIGS. 2, 4, illustrate another particular feature of the invention by reason of which the entire seal system peripherally of the vehicle may be provided through use of a plurality of identically shaped and sized cell-bag units which are adapted to be so relatively disposed and arranged at the four corners of a square-cornered vehicle as to readily provide a totally efficient air cushion sealing arrangement. Note that whereas the cell units running along the sides of the vehicle are mounted on the platform so as to splay downwardly and slightly inwardly therefrom, the cells at the bow of the vehicle are mounted so as to lean substantially backwardly thereunder and thereby present rearwardly sloping surfaces to the oncoming terrain, while the cell-bag units at the stern of the vehicle are also disposed so as to present downwardly and rearwardly sloping surfaces to the oncoming terrain. Thus, the cell-bag units at both the bow and the stern of the vehicle tend to wipe over and avoid snagging upon solid obstacles and/or rough water waves, or the like when the vehicle is in forward motion.

In order to attain an efficient air cushion sealing arrangement the cell-bag units at the two stern squarecornered portions of the vehicle are disposed as best shown at FIGS. 2, 4. Note that the two cornermost cell-bag units (designated 50—50 at FIGS. 2, 4) are disposed generally in longitudinal alignment with the side-run cell-bag units 12 but are mounted under the platform so as to splay in directions opposite to the directions of splay of their companions. Thus, a continuity of planar-pressure contact between the side wall portions of contiguous cell-bag units is provided throughout the entire periphery of the vehicle, as is indicated diagrammatically by the construction line 52 drawn on FIG. 4. Thus, the side walls of contiguous units throughout the entire seal system maintain efficient air sealing side-to-side pressured relationships, while remaining individually free to flex and move relative to one another as may be required to successfully encounter and surmount terrain variances and/or isolated obstacles.

It will be appreciated that by virtue of the present invention the cell-bag units require no mechanical or adhesive type interconnection means so as to hold contiguous cell-bag units close together in air cushion sealing fashion. Such devices are sometimes employed in connection with seal systems of the prior art; requiring use of undesirably complicated and otherwise troublesome arrangements. Also, it is to be particularly noted that the present invention employs relatively small diameter cell units to constitute the entire peripheral seal system and that each cell unit is supplied with relatively high pressure air, therefore providing the vehicle with a high payload capability. The use of relatively small diameter cells results in relatively low hoop tensions throughout the cell, thereby minimizing cell fabric stresses and improving snag and wear resistance.

I claim:

1. A surface effect vehicle including a platform provide with at least a partially perimetrally arranged skirting system through which air under pressure is discharged downwardly to supply a vehicle suport air cushion thereunder, said system providing a flexible barrier to retard escape of air from said air cushion, said system comprising a series of perimetrally aligned cell-bag units arranged in side-by-side juxtaposed relation, the cell member of each said units comprising a frusto-conical shaped sleeve formed of flexible airtight material and being open at the top and bottom ends thereof and having disposed therewithin a bag member formed of flexible perforated fabric and being open at its upper end and in air-flow communication with pressurized air supply means delivering into said bag member whereby to inflate the latter to provide a first-stage stiffness compartment while passing pressurized air into the cell member and thereby inflating the latter to provide a second-stage stiffness compartment; said cell member being arranged to circumscribe its bag member and being detachably mounted relative to the vehicle platform to facilitate replacement of the cell member independent of the bag member.

2. A surface effect vehicle as set forth in claim 1, wherein the degree of perforation of said bag member provides a prescribed bag-stiffness and air-passage ratio.

3. A surface effect vehicle as set forth in claim 2, wherein all of said cell-bag units are composed of like-shaped and like-sized cell-bag components.

4. A surface effect vehicle as set forth in claim 2, wherein the stern cornermost cell-bag units are disposed to splay in directions opposite to the directions of splay of their neighboring side and stern located cell-bag units.

5. A surface effect vehicle as set forth in claim 1, wherein said bag member is formed of substantially airtight fabric and is provided with an aperture sized to provide a prescribed bag-stiffness and air-passage ratio.

6. A surface effect vehicle as set forth in claim 1, wherein said bag member is located within the upper portion of said cell member.

7. A surface effect vehicle as set forth in claim 6, wherein all of said cell-bag units are composed of like-shaped and like-sized cell-bag components.

8. A surface effect vehicle as set forth in claim 1, wherein said skirting system comprises a plurality of said cell-bag units extending below the entire perimeter of the vehicle plan form.

9. A surface effect vehicle as set forth in claim 8, wherein all of said cell-bag units are composed of like-shaped and like-sized cell-bag components.

10. A surface effect vehicle as set forth in claim 9, wherein the stern cornermost cell-bag units are disposed to splay in directions opposite to the directions of splay of their neighboring side and stern located cell-bag units.

11. A surface effect vehicle as set forth in claim 1, wherein the cell-bag units disposed below the sides of the vehicle platform present downwardly and inwardly inclined surfaces exteriorly of the vehicle, while the cell-bag units at the bow and stern of the vehicle present downwardly and rearwardly sloping surfaces to the oncoming terrain when the vehicle is in forward motion.

12. In a surface effect vehicle having a body which is to be supported by an underlying air cushion, the combination of:
an air cushion confining skirt depending from said body and including a series of side-by-side units of similar construction;
each unit including a mounting plate attached to the vehicle and having a generally oval outline presenting elongate opposite sides, the mounting plates of said series of units being disposed so that adjacent elongate sides of adjacent mounting plates are in close proximity, a flexible bag affixed circumferentially to each mounting plate and bellying downwardly therefrom and each such bag being apertured to pass air therethrough, and a generally frusto-conical sleeve having its large end uppermost and embracing said bag around the associated mounting plate, each sleeve extending downwardly from its mounting plate to position its smaller end well below the lower extremity of the bag; and means for supplying air at a sufficient rate into all of the bags as to inflat and stiffen them as well as to inflate and stiffen each sleeve whereby inherently to stiffen the bag and sleeves to different degrees; said units being crowded together sufficiently close as to cause side surface portions of adjacent sleeves to engage in intimate face-to-face contact thereby to define an air cushion confining but locally deformable flexible skirt construction.

* * * * *